United States Patent [19]

Sundberg et al.

[11] Patent Number: 4,669,735
[45] Date of Patent: Jun. 2, 1987

[54] FAIL SAFE HIGH PRESSURE SHAFT SEAL

[75] Inventors: Jack G. Sundberg, Meriden; Andrew Gahura, Winstead, both of Conn.

[73] Assignee: Colt Industries Inc., New York, N.Y.

[21] Appl. No.: 782,414

[22] Filed: Oct. 1, 1985

[51] Int. Cl.[4] .................. F16J 15/34; F16J 15/40; F16J 15/54

[52] U.S. Cl. ............................. 277/1; 277/2; 277/27; 277/38; 277/40; 277/70; 277/85

[58] Field of Search ............ 277/1, 38, 39, 40, 41, 277/85, 87, 215, 27, 3, 83, 70, 2

[56] References Cited

U.S. PATENT DOCUMENTS

| | | | |
|---|---|---|---|
| 2,668,068 | 2/1954 | Bredemeier | 277/85 |
| 3,165,323 | 1/1965 | Hamano | 277/41 |
| 3,214,182 | 10/1965 | Herbruggen | 277/215 X |
| 3,239,232 | 3/1966 | Andresen | 277/40 X |
| 3,718,336 | 2/1973 | Jackson et al. | 277/40 |
| 3,926,442 | 12/1975 | Muller | 277/27 X |
| 4,304,408 | 12/1981 | Greenawalt | 277/40 |

Primary Examiner—Allan N. Shoap
Attorney, Agent, or Firm—Richard A. Dornon

[57] ABSTRACT

A shaft seal assembly 10 for a high speed centrifugal pump has a primary seal (30) and a secondary seal (32). During normal operation the primary seal has its nose (38) in firm engagement with a seal face (28) and the secondary seal has its nose (42) in light engagement with the seal face. Upon failure of the primary seal, the nose of the secondary seal is urged into firm engagement with the seal face. An orifice (58) in the nose of the secondary seal allows for controlled leakage which indicates primary seal failure.

4 Claims, 1 Drawing Figure

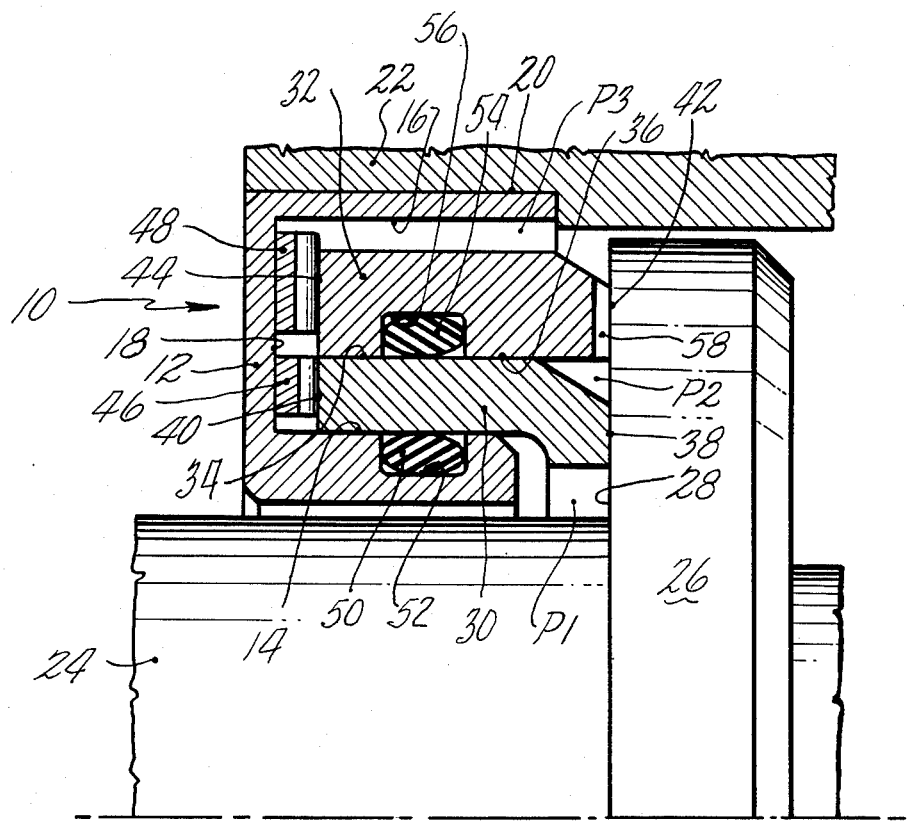

FAIL SAFE HIGH PRESSURE SHAFT SEAL

TECHNICAL FIELD

This invention relates to shaft seals, and more particularly to shaft seals for aircraft engine fuel pumps.

BACKGROUND ART

Existing high pressure aircraft engine fuel pumps are typically positive displacement pumps such as gear pumps or vane pumps. In such pumps, shaft seals can be located in low pressure cavities whereby the seals are not subjected to high pressure.

High speed centrifugal fuel pumps capable of developing high fuel pressures (e.g., 700 psi) are now being seriously considered for aircraft engine applications. In general, high speed centrifugal pumps are mounted for rotation by means of ball bearings which are lubricated by oil. Oil lubrication of the bearings mandates the inclusion of a dual fuel to oil seal with an overboard drain therebetween. Since the fuel pressure developed by a high speed centrifugal pump is relatively high, a failure in a fuel seal can result in flooding of the overboard drain cavity and a consequential fuel leak into the oil cavity.

DISCLOSURE OF INVENTION

In accordance with the invention, there is provided a high pressure shaft seal well-suited to a centrifugal pump application which incorporates a primary face seal and a secondary face seal. During normal operation, the secondary seal is urged into the seal face with only a small spring force. Upon the failure of the primary seal the secondary seal becomes pressure louded into the seal face whereby leakage is controlled. In addition to controlling leakage, the secondary seal performs the function of a seal failure indicator since leakage during operation of the secondary seal will normally be greater than that allowed for normal operation.

Accordingly, it is a primary object of the invention to provide a shaft seal adapted for high pressure operation which incorporates a primary seal and a secondary seal capable of performing the sealing function upon failure of the primary seal.

This and other objects and advantages of the invention will become more readily apparent from the following detailed description when taken in conjunction with the accompanying drawing, in which:

BRIEF DESCRIPTION OF DRAWINGS

The drawing shows an axial sectional view of a preferred seal of the invention, taken through one side of the seal and a portion of the shaft.

BEST MODE OF CARRYING OUT THE INVENTION

Referring to the drawing, there is shown a shaft seal assembly 10 for an aircraft engine fuel pump, particularly a high speed centrifugal pump. The seal assembly 10 has universal applicability and may be installed at any appropriate location in a pump housing to seal fuel from oil or fuel from the exterior of the housing. The seal assembly 10 includes a seal housing 12 having opposed cylindrical inner and outer walls 14 and 16 and an endwall 18. The seal housing 12 is press fitted into an annular recess 20 formed in pump housing 22 in concentric relationship with a rotating pump drive shaft 24 having a integral rotor or runner 26 which presents a flat seal face 28.

Nested within seal housing are a primary seal 30 and a secondary seal 32 of annular configuration and formed of carbon or the like. The seals 30 and 32 are held against rotation by suitable means (not shown). The primary seal 30 and the secondary seal 32 are disposed in the housing in concentric contiguous relationship such that the radically outer peripheral surface 34 of the primary seal abuts the radially inner peripheral surface 36 of the secondary seal 32. The primary seal 30 has an annular nose 38 at its front end which engages the seal face 28 and a rear end 40 spaced from the endwall 18. Similarly, the secondary seal 32 has an annular nose 42 at its front end which engages the seal face 28 and a rear end 44 spaced from the endwall 18. Two concentrically arranged universal or gimbal washers (which are also known as wave springs) 46 and 48 are respectively interposed between the rear ends 46 and 48 of the primary and secondary seals 30 and 32 and the endwall 18 to urge their respective noses 38 and 42 into engagement with the seal face 28.

A sealing element 50, in the form of an o-ring seated in an annular recess 52 in the housing 12, seals the volume behind the seals 30 and 32 from the annular volume between the front inner periphery of the primary seal 30, the inner outer periphery of the housing 12 and the outer periphery of the shaft 24. The pressure in this volume is designated P1. A sealing element 54, in the form of an o-ring, is seated in an annular recess 56 in the secondary seal 32 to seal off the volume behind the seal 32 from the annular volume defined between the front portions of the seals 30 and 32, which volume has a pressure designated P2. It will be noted that the annular volume behind the seals and the annular volume between the radically outer periphery of the secondary seal 32 and the outer wall 16 is at a pressure designated P3.

The annular nose 42 of the secondary seal 32 has at least one orifice 58 formed therein fluidly interconnecting the volumes at the pressures P2 and P3. The function of the orifice is to maintain P2 equal to P3 during normal operation. Orifice 58 may be constituted by a groove in the nose 58, a drilled passage or other suitable means. Normally pressure P3 is high and pressure P1 is low.

In operation, when the primary seal 30 is functioning normally, there is no flow between the volumes at pressures P3 and P2 through orifice 58 and hence, pressure P2 is equal to pressure P3. However, upon failure of the primary seal 30, pressure P2 will drop to a low value which may even approach that or be equal to that of pressure P1. Failure of the primary seal 30 will thus cause a pressure gradient to develop across the nose 42. Since high pressure P3 will be acting on the rear end of the secondary seal 32, the resultant pressure force will urge the nose 42 into firm sealing engagement with the seal face 28. There will of course be a controlled leakage through the orifice during secondary seal operation and this leakage will act as an indicator of primary seal failure.

During normal operation, the universal washer 48 imposes only a very slight spring load upon the secondary seal 32 to urge its nose 42 into light engagement with the seal face 28. In this regard, it will be appreciated that the washer 48 could be entirely eliminated if the secondary seal were sized to have its nose 42 spaced from the seal face by a small fixed clearance.

Obviously, many modifications and variations are possible in light of the above teachings without departing from the scope and spirit of the invention as defined in the appended claims:

We claim:

1. In a shaft seal assembly for a pump having a pump housing and a drive shaft with an axially facing seal face, and having a seal housing mounted upon the pump housing in surrounding relationship to the drive shaft, and having an annular seal having an axial front end and an opposite facing axial rear end with the face of the front end in wiping engagement with the seal face, the improvement comprising:

an annular secondary seal, having an axial front end and an opposite facing axial rear end with a face on the front end for engaging the seal face and substantially juxtaposed thereto mounted in the seal housing in concentric relationship to the first mentioned seal such that a first annular volume space is defined between the front ends of the first mentioned and secondary seals, a second annular volume space is defined between the radial outer periphery of the secondary seal and the seal housing and the rear ends of the first mentioned and secondary seals are exposed to the pressure in the second annular volume; and orifice means to fluidly interconnect the first and second annular volume spaces such that the pressure force acting on the secondary seal in the direction of the seal face increases upon failure of the primary seal due to a pressure differential between the volume spaces created by the failure and a controlled leakage emanates from the shaft seal assembly through said orifice means.

2. The improvement of claim 1 wherein the orifice means comprises a groove in the nose of the secondary seal.

3. The improvement of claim 2 further comprising:
means bias to urge the front ends of the first mentioned and secondary seals into engagement with the seal face.

4. In a method of sealing around a shaft having a seal face, the steps comprising:

firmly engaging the seal face with a primary seal by employing a first pressure force;

lightly engaging the seal face with a secondary seal in concentric relationship to the primary seal by employing a second pressure force that is less than said first pressure force;

increasing the pressure force acting on the secondary seal in the direction of the seal face upon failure of the primary seal so as to have the secondary seal firmly engage the seal face; by a pressure force substantially greater than said second pressure force; and providing a controlled leakage to act as a seal failure indicator upon failure of the primary seal.

* * * * *